United States Patent [19]

Goodrich

[11] Patent Number: 5,029,471
[45] Date of Patent: Jul. 9, 1991

[54] LIQUID LEVEL SENSOR ASSEMBLY
[75] Inventor: Brian C. Goodrich, Los Gatos, Calif.
[73] Assignee: Watkins Johnson Company, Palo Alto, Calif.
[21] Appl. No.: 601,408
[22] Filed: Oct. 23, 1990
[51] Int. Cl.⁵ ............................................. G01F 23/02
[52] U.S. Cl. ...................................... 73/293; 250/577; 340/619
[58] Field of Search ......................... 73/293; 250/577; 340/619

[56] References Cited
U.S. PATENT DOCUMENTS

| 3,834,235 | 9/1974 | Bouton et al. | 250/577 X |
| 4,899,585 | 2/1990 | Kulha | 73/293 |
| 4,961,069 | 10/1990 | Tsaprazis | 73/293 X |

Primary Examiner—Daniel M. Yasich
Attorney, Agent, or Firm—Flehr, Hohbach, Test, Albritton & Herbert

[57] ABSTRACT

A liquid level sensor assembly for a liquid-chemical bubbler includes a removable cylindrical LED housing, which is removably retained within a cylindrical axial bore of a sealing nut. The LED housing is removable from within the cylindrical axial bore without breaking the seal between the chemical liquid within the bubbler and the ambient atmosphere. The LED housing holds an LED transmitter and a photodiode detector, which respectively sends light into a cylindrical quartz rod and receives reflected light from the quartz rod, where the reflected light is used to measure the level of the chemical liquid within the bubbler.

2 Claims, 3 Drawing Sheets

LIQUID LEVEL SENSOR ASSEMBLY

BACKGROUND OF THE INVENTION

1. Field of the Invention

This invention relates to liquid level sensors using optical sensing of light through a quartz rod.

2. Prior Art

Quartz rod liquid-level sensors are commonly used to measure the level of a chemical liquid in a bubbler chamber. A carrier gas is bubbled through the chemical liquid in the bubbler chamber. This vaporizes the chemical liquid and the vapor is contained within the bubbler chamber in the space above the surface of the liquid chemical. The level of the liquid chemical within the bubbler chamber is sensed using a cylindrical quartz rod. The cylindrical quartz rod is inserted through an adapter mounted to the top cap of the bubbler chamber so that the bottom end of the quartz rod is near the top surface of the chemical liquid. The bottom end of the quartz rod is formed into a polished conical-shaped surface. A light beam from a light-emitting diode LED transmitter is projected through the top end of the quartz rod and down through the quartz rod to the conical-shaped bottom surface of the quartz rod. If the conical-shaped surface is not immersed in the chemical liquid, light is reflected back up the quartz rod to a detector located next to the laser diode transmitter. Conversely, if the conical-shaped surface is immersed in the chemical liquid, light passes through the conical end into the liquid chemical and is not reflected back through the quarts rod to the laser diode detector. The LED transmitter and the detector are both held within a plug assembly.

A prior-art plug assembly includes a locking nut which is threaded onto the adapter for mounting the quartz rod. The plug assembly forms an integral part o f the sealing mechanism for the quartz rod. Consequently, if it is desired to remove the plug assembly to service the LED transmitter and detector, the vapor seal for the bubbler chamber is broken, permitting contaminants to enter the bubbler system. These contaminants ultimately may be deposited on a semiconductor wafer being processed using chemical vapor from the bubbler system. If the system seal is broken, an operator may also be exposed to a hazardous chemical material.

SUMMARY OF THE INVENTION

It is therefore an object of the invention to provide a liquid level sensor assembly which permits servicing of the laser diode transmitter and detector without breaking the vapor seal.

In accordance with this and other objects of the invention, a liquid level sensor assembly for a bubbler is provided. The assembly features a removable cylindrical LED housing which is removably retained within a cylindrical axial bore of a sealing nut. The LED housing is removable from within the cylindrical axial bore without breaking the seal between the chemical liquid within the bubbler and the ambient atmosphere. The LED housing is designed to hold an LED transmitter and a photodiode detector The cylindrical LED housing is received within the cylindrical axial bore of the sealing nut to position the LED transmitter and photodiode detector with respect to the top flat surface of a cylindrical quartz rod which extends down to the liquid level being measured. The LED transmitter and photodiode detector, respectively, send light into the cylindrical quartz rod and receive reflected light from the quartz rod, where the reflected light is used to measure the level of the chemical liquid within the bubbler.

The cylindrical quartz rod has a conical surface at one end for interfacing with the surface of the chemical liquid contained within the bubbler.

A mounting adapter is fixed at its proximate end to the top of the bubbler for holding the cylindrical quartz rod in position within the bubbler. The adapter terminates at its distal end in a flat surface. The adapter also has external threads formed at its distal end. An O-ring is positioned around the quartz rod to provide a seal between the quartz rod and the interior surface of an axial bore within the adapter. A split retaining washer engages a radial external groove formed in the cylindrical quartz rod to hold the rod in place.

A sealing nut is provided which has internal threads for engagement with the external threads of the mounting adapter. The sealing nut has an internal cylindrical step which engages with the top surface of the split retaining washer to hold the cylindrical quartz rod in position within said adapter to provide a seal between the chemical liquid within the bubbler and the ambient atmosphere. The sealing nut includes a cylindrical axial bore for receiving the removable cylindrical LED housing. The cylindrical LED housing is retained within the cylindrical axial bore by a C-ring which removably engages an interior radial groove in the sealing nut. The LED housing is removable form within the cylindrical axial bore without breaking the seal between the chemical liquid within the bubbler and the ambient atmosphere.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
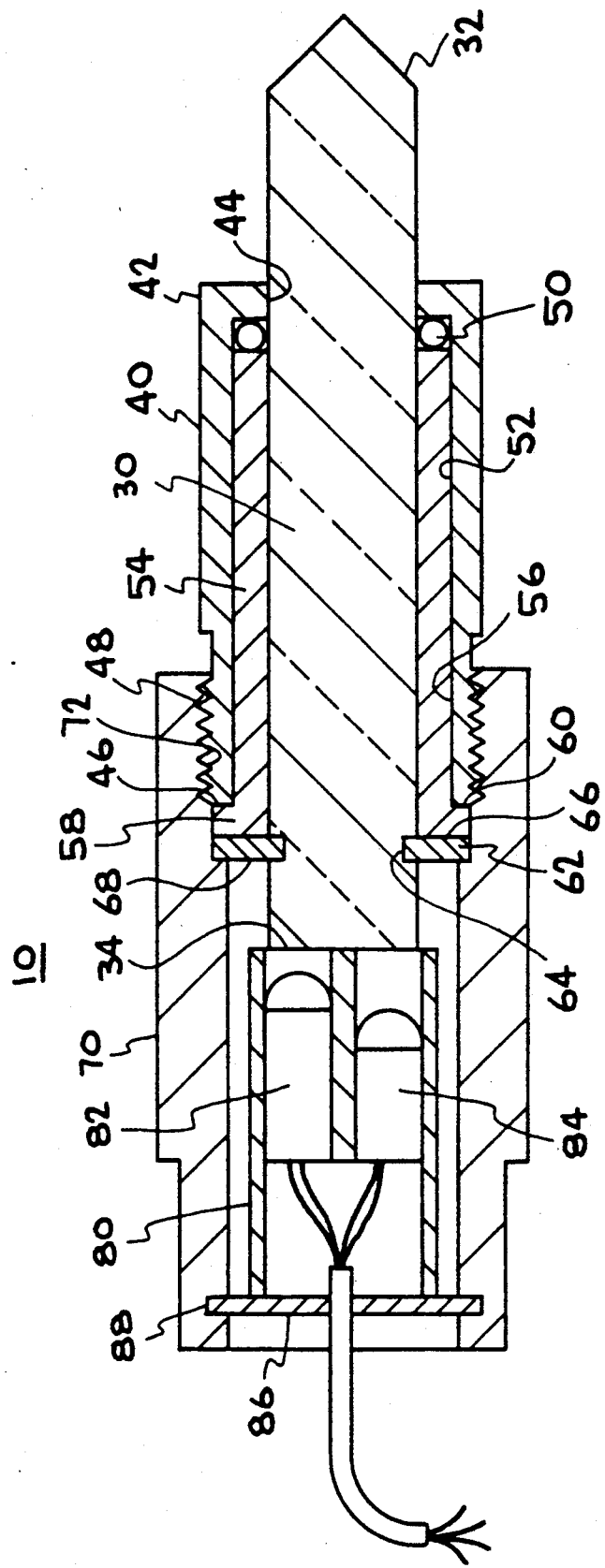
FIG. 1 is a sectional view of a liquid level sensor assembly according to the invention.

FIG. 1 shows an enlarged cross-sectional view of a liquid-level sensor assembly 10 used in a stainless-steel liquid-chemical bubbler chamber, through which a carrier gas is bubbled through the bubbler chamber to vaporize liquid-chemical contained therein.

Figure 2:
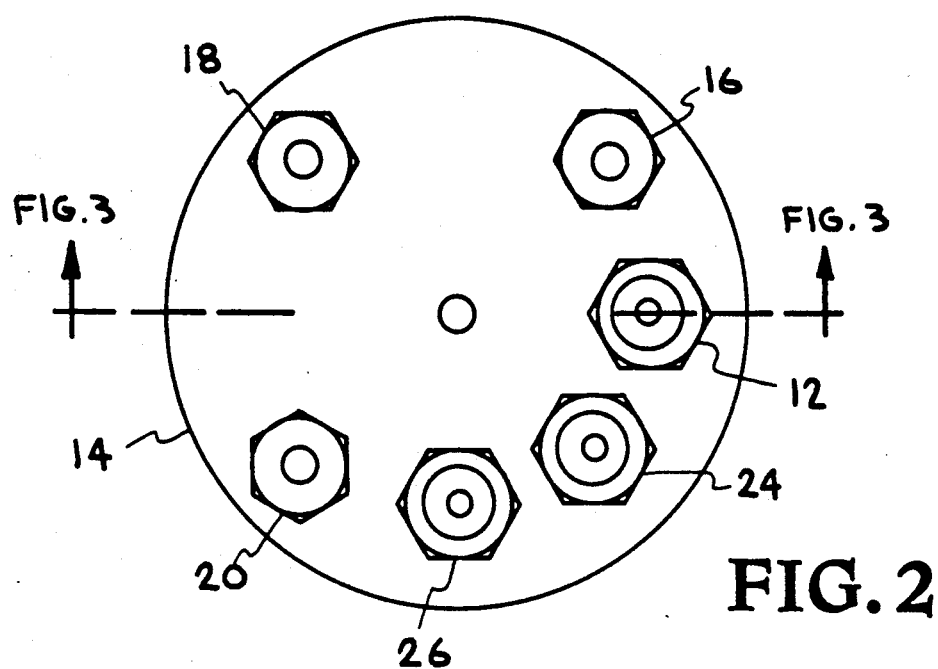
FIG. 2 is a plan view of a bubbler which uses liquid level sensors according to the invention.
Figure 3:
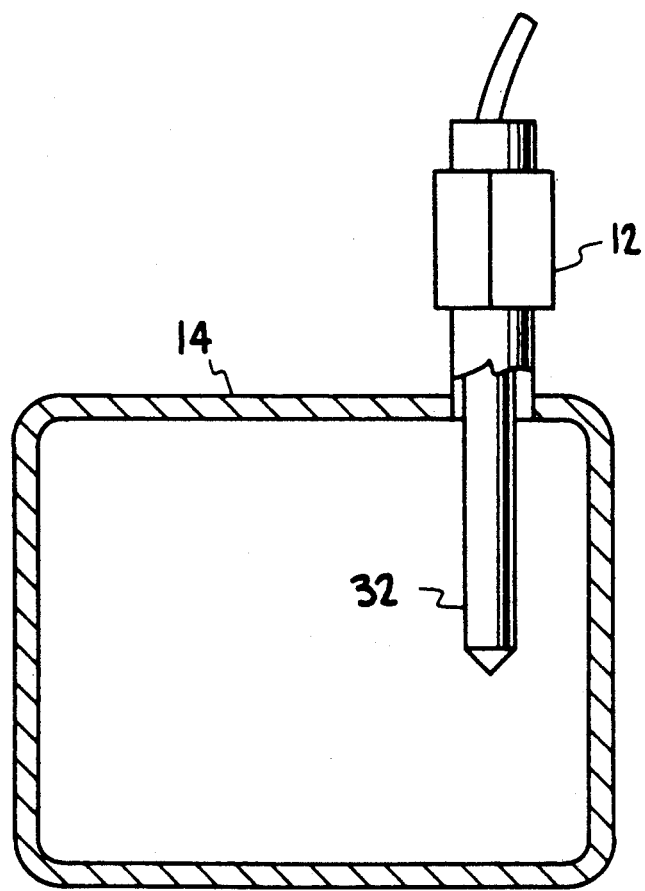
FIG. 3 is a sectional view of the bubbler of FIG. 2.

FIGS. 2 and 3 respectively show a plan view and a cross-sectional view of a liquid-level sensor assembly 12 with a liquid-level sensor assembly 10 fixed to the top endwall 14 thereof. This sensor assembly is used to measure, for example, a high-limit level for the chemical liquid in the bubbler chamber 12.

The plan view of FIG. 2 shows a fitting 16 for a stainless-steel carrier-gas inlet pipe, a fitting 18 for a stainless-steel chemical-liquid inlet pipe; a fitting for a stainless-steel chemical vapor outlet pipe, and a pipe for a temperature-sensing thermocouple.

The plan view of FIG. 2 also shows two other liquid-level sensor assemblies 24, 26 which measure, for example a low-limit level and an operating-level for the chemical liquid in the bubbler chamber 12.

Referring now to FIG. 1, an elongated cylindrical quartz rod 30 having a conical surface 32 formed at its lower end. The conical surface interfaces with a chemical liquid contained within the bubbler chamber 12. The other end of the quartz rod 30 has top flat polished surface 34. Light is received from an external source into the quartz rod through the polished surface 34. Light reflected from the conical surface is transmitted back out of the quartz rod through the polished surface 34.

Figure 4:
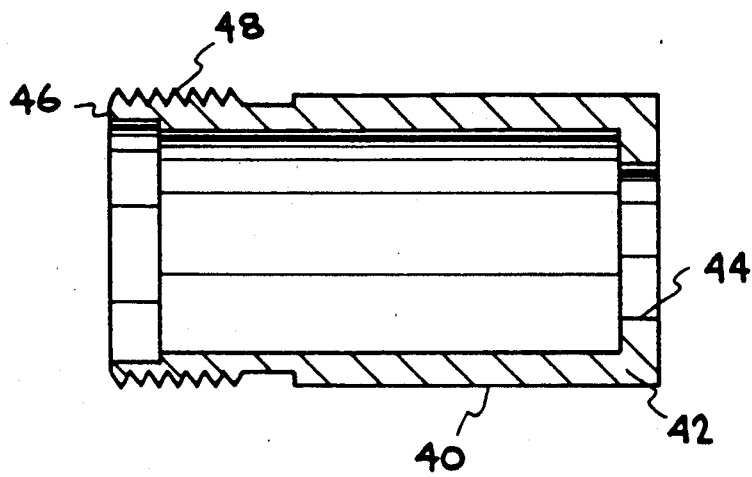
FIG. 4 is a cross-sectional view of an adapter mounted to the top wall of a bubbler chamber and used for holding a quartz rod.

Referring to FIGS. 1 and 4, a mounting adapter 40 is fixed at its lower, proximate end 42 to the top endwall 14 of the bubbler chamber 12 through an aperture formed through the top endwall 14. The mounting adapter 40 mounts the quartz rod 30 in position with respect to the chemical liquid contained within the bubbler chamber 12. The mounting adapter has an interior cylindrical bore 44 at its lower end through which passes the quartz rod 30. The mounting adapter 40 terminates at its distal, upper end in a flat surface 46. External threads 48 are formed on the outside surface of the mounting adapter near is upper end, as shown in the Figures.

An O-ring 50 is positioned around the quartz rod 30 and provides a seal between the quartz rod and the interior surface of a long bore 52 in the mounting adapter 40, where the long bore 52 is formed concentric with and is larger in diameter than the bore 44.

A cylindrical sleeve 54 has an internal cylindrical axial bore 56 through which the quartz rod 30 passes. The sleeve 54 has an external cylindrical surface 58 which is adjacent to the surface 56 of the long bore 52 of the mounting adapter 40. The cylindrical sleeve 54 has a flange 58 formed at one end, wherein the lower surface 60 of the flange 58 engages the flat surface 46 at the distal end of the mounting adapter 40. The O-ring 50 is positioned at the other end of the cylindrical sleeve 54, as shown in the Figures.

A split retaining washer 62 engages a radial external groove 64 formed near the top of the cylindrical quartz rod 30. The split retaining washer 62 has a lower surface 66 which engages the upper surface 68 of the flange 58 of the cylindrical sleeve 54.

Figure 5:
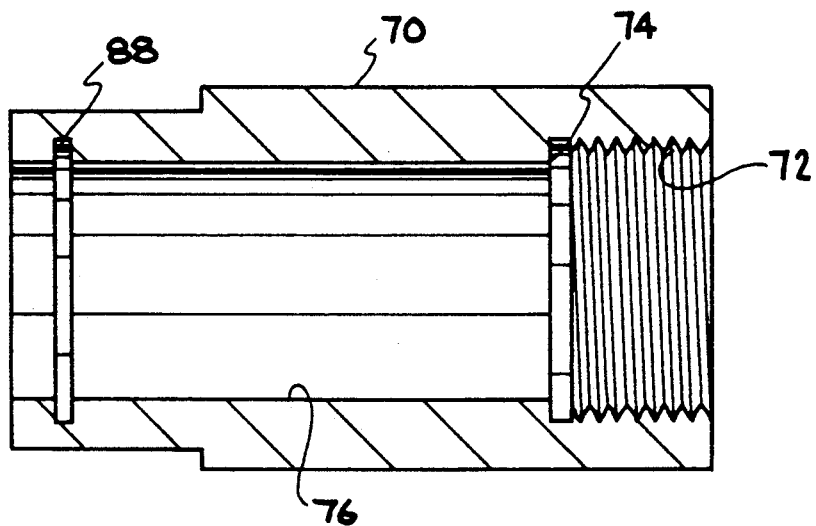
FIG. 5 is a cross-sectional view of a sealing nut for holding an LED housing according to the invention.

Referring to FIGS. 1 and 5, a sealing nut 70 has internal threads 72 for engagement with the external threads 48 of the adapter. An internal cylindrical step 74 engages with the top surface of the split retaining washer to hold the cylindrical quartz rod 32 in position and provides a seal between the chemical liquid within the bubbler and the ambient atmosphere. The sealing nut includes a cylindrical axial bore 76.

Figure 6:
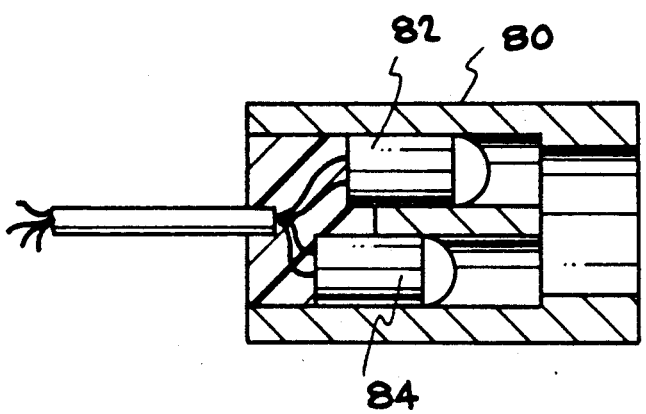
FIG. 6 is a detailed cross-sectional view of an LED housing for a light emitting diode and light detector.

Referring to FIGS. 1 and 6, a removable cylindrical LED housing 80 is removably retained within the cylindrical axial bore 76 of the sealing nut 70. The LED housing is removed from within the cylindrical axial bore without breaking the seal between the chemical liquid with said bubbler and the ambient atmosphere. The LED housing 80 holds an LED transmitter 82 and a photodiode detector 84 which are sealed in place with a sealing compound. The LED housing is received within the cylindrical axial bore of the sealing nut to position the LED transmitter and photodiode detector with respect to the top flat surface 34 of said cylindrical quartz rod 32 for respectively sending light into the quartz rod and for receiving reflected light from the quartz rod. The reflected light is used to measure the level of a chemical liquid within the bubbler.

A C-ring 86 engages an internal groove in sealing nut 70 and provides for convenient removal of the LED housing 80 from the sealing nut without breaking the system seal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A liquid level sensor assembly for a bubbler, comprising:
   a cylindrical quartz rod, which has a conical surface at one end for interfacing with a chemical liquid contained within said bubbler and which has a top flat surface at the other end for receiving light into the quartz rod and for transmitting reflected light back out of the quartz rod;
   an adapter fixed at its proximate end to the top of said bubbler for holding said quartz rod in position within said bubbler, said adapter having an interior cylindrical bore through which passes the quartz rod, said adapter terminating at its distal end in a flat surface, said adapter having external threads formed at its distal end;
   an O-ring positioned around said quartz rod and providing a seal between said quartz rod and the interior surface of the bore of said adapter;
   a cylindrical sleeve having an internal cylindrical axial bore through which said quartz rod passes and having an external cylindrical surface positioned adjacent to the surface of the interior cylindrical bore of said adapter, said cylindrical sleeve have a flange formed at one end, wherein the lower surface of said flange engages the flat surface at the distal end of the adapter;
   a split retaining washer which engages a radial external groove formed in said cylindrical quartz rod, said split retaining washer having a lower surface which engages the upper surface of the flange formed at one end of the cylindrical sleeve;
   a sealing nut having internal threads for engagement with the external threads of the adapter, said sealing nut having formed therein an internal cylindrical step which engages with the top surface of the split retaining washer to hold said cylindrical quartz rod in position within said adapter and to provide a seal between the chemical liquid within the bubbler and the ambient atmosphere;

wherein said sealing nut includes a cylindrical axial bore;

a removable cylindrical LED housing which is removably retained within said cylindrical axial bore of said sealing nut, said LED housing being removable from within said cylindrical axial bore without breaking the seal between the chemical liquid within said bubbler and the ambient atmosphere, said LED housing including means for holding an LED transmitter and a photodiode detector, said cylindrical LED housing being received within the cylindrical axial bore of the sealing nut to position the LED transmitter and photodiode detector with respect to the top flat surface of said cylindrical quartz rod for respectively sending light into the quartz rod and for receiving reflected light from the quartz rod, said reflected light being used to measure the level of a chemical liquid within the bubbler.

2. The liquid level sensor assembly of claim 1 including means for retaining said cylindrical LED housing within said cylindrical axial bore, wherein said retaining means includes an interior radial groove, which is formed within the cylindrical axial bore of the sealing nut, and a C-ring which removably engages said interior radial groove.

* * * * *

UNITED STATES PATENT AND TRADEMARK OFFICE
CERTIFICATE OF CORRECTION

PATENT NO. : 5,029,471
DATED : July 9, 1991
INVENTOR(S) : Brian C. Goodrich It is certified that error appears in the above-identified patent and that said Letters Patent is hereby corrected as shown below:

At column 1, line 37, change "o" to --of--

At column 1, line 38, delete "f"

At column 2, line 29, change "form" to --from--

At column 3, line 4, delete "liquid level sensor assembly" and insert --bubbler chamber--

At column 3, line 39, delete "is" and insert --its--

At column 3, line 48, change "58" to --56--

At column 3, line 49, delete "56"

At column 3, line 65, change "32" to --30--

At column 4, line 13, change "32" to --30--

Signed and Sealed this

Twenty-eighth Day of September, 1993

*Attest:*

BRUCE LEHMAN

*Attesting Officer*   *Commissioner of Patents and Trademarks*